Figure 1:
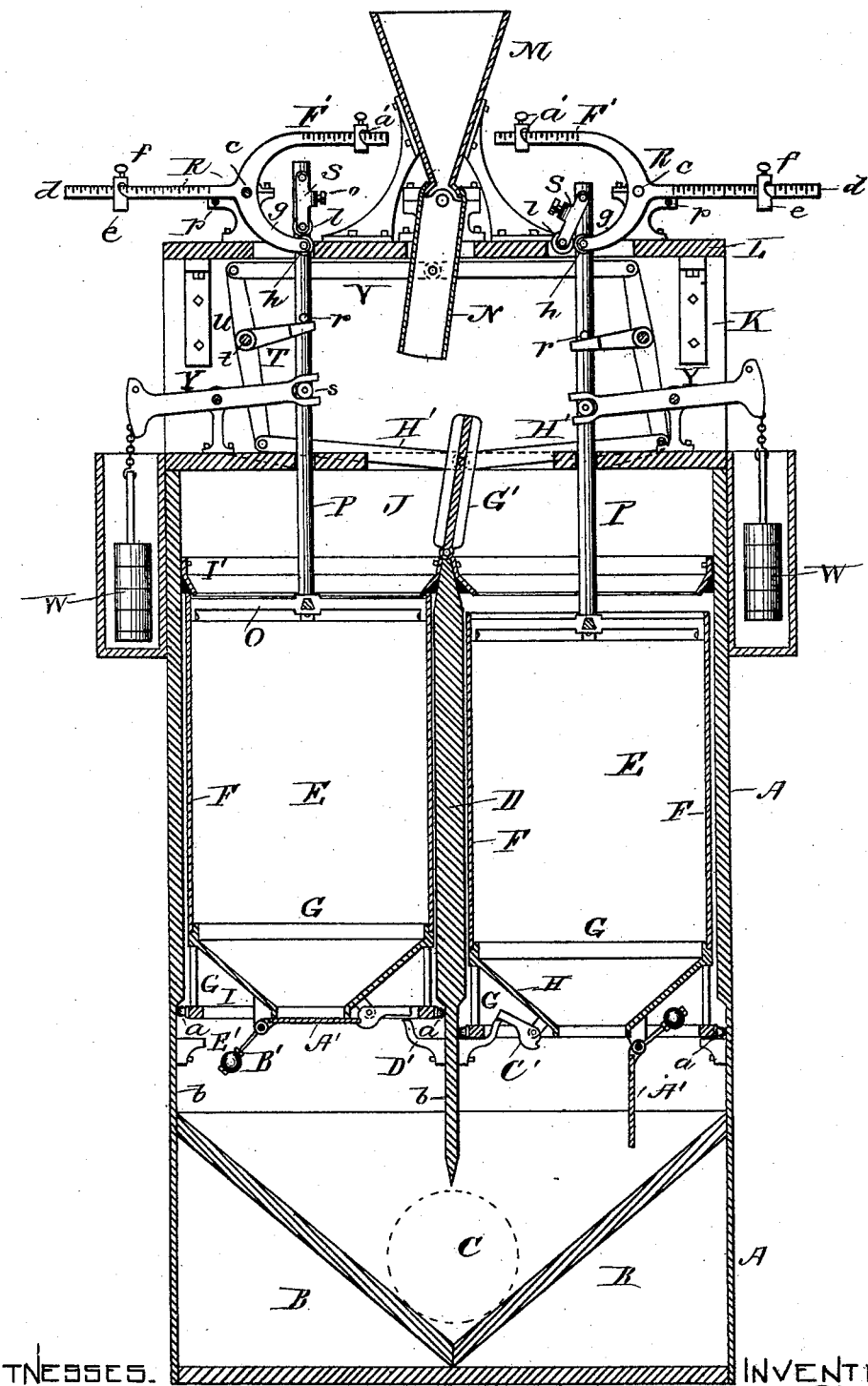

(No Model.) 3 Sheets—Sheet 1.

C. H. PHILLIPS.
GRAIN WEIGHING MACHINE.

No. 440,794. Patented Nov. 18, 1890.

WITNESSES.
Frank G. Parker
Matthew M. Blunt

INVENTOR.
Charles H. Phillips
by his attorney
Alex. L. Hayes (No Model.) 3 Sheets—Sheet 2.

C. H. PHILLIPS.
GRAIN WEIGHING MACHINE.

No. 440,794. Patented Nov. 18, 1890.

WITNESSES.
Frank G. Parker
Matthew M. Blunt

INVENTOR.
Charles H. Phillips
by his attorney
Alx. L. Hayes (No Model.) 3 Sheets—Sheet 3.
C. H. PHILLIPS.
GRAIN WEIGHING MACHINE.

No. 440,794. Patented Nov. 18, 1890.

WITNESSES:
H. F. Pierce.
Geo. S. Lee.

INVENTOR:
Charles H. Phillips.
by his attorney
Alx. L. Hayes.

UNITED STATES PATENT OFFICE.

CHARLES H. PHILLIPS, OF BOSTON, MASSACHUSETTS.

GRAIN-WEIGHING MACHINE.

SPECIFICATION forming part of Letters Patent No. 440,794, dated November 18, 1890.

Application filed September 25, 1889. Serial No. 325,040½. (No model.)

*To all whom it may concern:*

Be it known that I, CHARLES H. PHILLIPS, of Boston, in the county of Suffolk and State of Massachusetts, have invented a new and useful Improvement in Weighing-Machines, of which the following, taken in connection with the accompanying drawings, is a specification.

This invention relates to that class of weighing and measuring machines which are used for continuously weighing and measuring substances—such as grain, coal, or broken ore—while discharging from a chute or spout without interrupting this discharge, and has for its object the production of an improved machine which will perform this work with rapidity and accuracy and which will be more particularly adapted for weighing coal or other substances which are composed of small masses.

To this end the invention consists in the combination, substantially as hereinafter more fully set forth, of a pair of suspended buckets or receptacles arranged side by side, and each provided at its bottom with a gate which is automatically opened downward by the descent of the receptacle or bucket, so as to permit the discharge of the contents of the same, and closed on its ascent, a scale-beam or balance connected with each bucket and provided with an attachment whereby the bucket is prevented from descending until the weight of the contents is equal to the weight indicated upon the scale-beam or balance, an oscillating chute by which the coal or other substance is discharged into one bucket or the other, according to the position of the chute, and mechanism operated by the descent of each bucket when filled to shift the end of the chute, so that it will discharge into the empty bucket.

The invention also consists in the combination, substantially as hereinafter more fully set forth, with the above-described mechanism, of a double-faced chute pivoted under the discharging-chute and mechanism operated by the descent of each bucket and acting to simultaneously move the oscillating discharging-chute in one direction and the double-faced chute in the other direction.

The invention also consists in the arrangement of the buckets or receptacles, substantially as hereinafter more fully set forth, whereby each has an independent vertical movement, in combination with a weight or counterpoise attached to each bucket for causing it to rise to its normal position when by the discharge of its contents its weight becomes less than that of the counterpoise.

The invention also consists in the form of the oscillating discharging-chute, as hereinafter more fully set forth, whereby it is adapted to discharge, without clogging, substances—such as coal—composed of small masses.

In the accompanying drawings I have shown a machine which embodies the principle of my invention.

Figure 2:
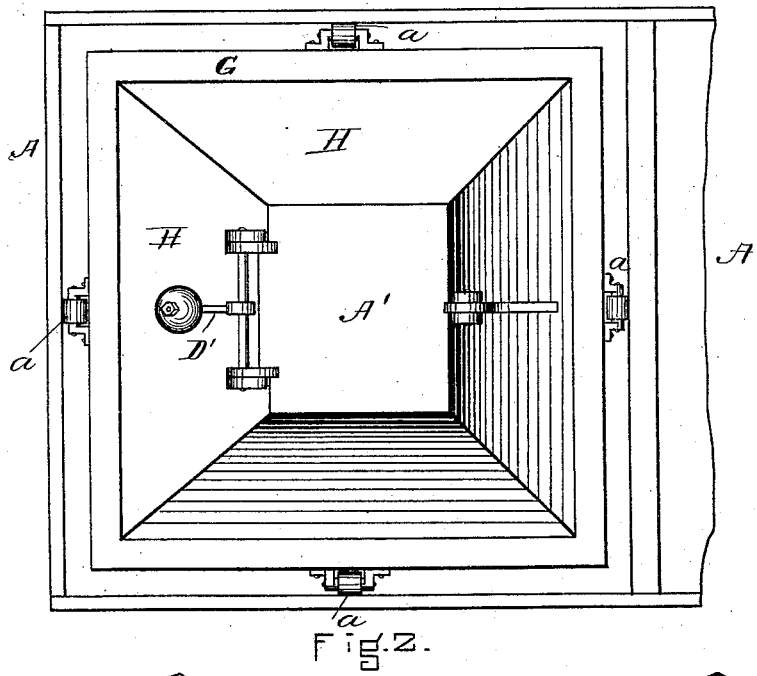
Figure 3:
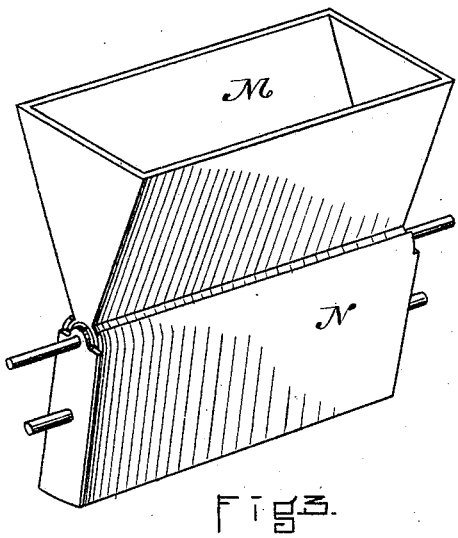
Figure 4:
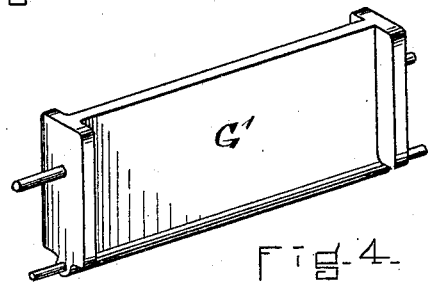
Figure 5:
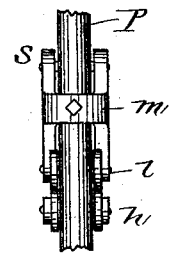
Figure 6:
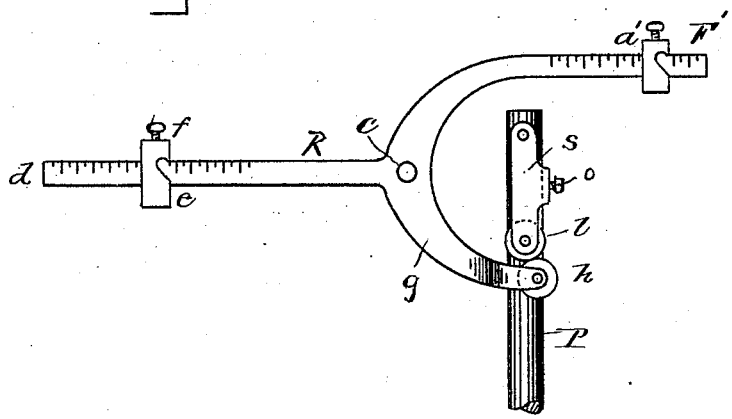
Figure 7:
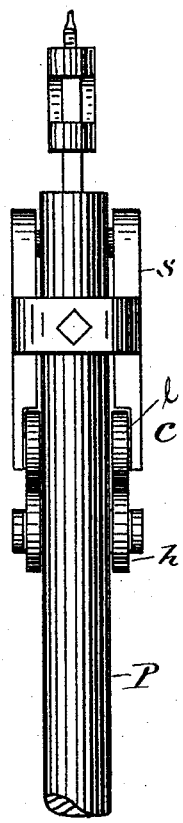

In the drawings, Figure 1 is a vertical sectional view of the machine. Fig. 2 is a plan view of the section of one of the buckets. Fig. 3 is a perspective view of the oscillating discharging-chute. Fig. 4 is a perspective view of the double-faced chute. Fig. 5 is a detail view in elevation of the device connected with the scale-beam for holding the bucket in position, and Figs. 6 and 7 are enlarged detail views illustrating the devices for supporting the buckets upon the scale-beam.

In the several figures the same letters refer to the same parts.

Referring to the drawings, A is a suitable case made of wood or other suitable material, in which the buckets move. In the bottom of this case are preferably placed the inclined sides B B, meeting at the medial line of the case in order to divert the coal or other substance toward a suitable opening C, from which it is discharged.

D is a central partition on the case, which extends nearly to the top of the same.

E E are the buckets or receptacles. Each of these is shown as having an independent vertical movement in the space between the central partition D and the sides of the case A, and are provided with walls F F, which are preferably made of sheet-iron; but they may be connected together so that one bucket will be moved by the other. These walls are supported upon a rectangular frame G, in which are placed four inclined side pieces H, which form the bottom of the bucket. In order to facilitate the movement of the bucket the lower member I of the frame is provided with friction-rollers $a$, which bear against recesses $b$ in the side walls of the cases A and in the central partition respectively. This construction of the bottom of the buckets is adapted as suitable for the purpose; but any other suitable construction may be used.

The top of the case A is covered, with the exception of a central opening J, of sufficient width to extend equally on both sides, partly over the spaces in which the buckets move, and equal to or greater than the width of the arc described by the extremity of the oscillating discharging-chute.

Supported above the top of the case A upon side walls K and parallel with this top is a top piece L, of wood or other suitable material, supporting the fixed hopper M, which hopper receives the coal or other substance as it is discharged from the vessel or elevator. Connected to the bottom of this hopper is the oscillating discharging-chute N, pivoted at its upper extremity to a suitable support or otherwise under the hopper M, and, according to the position of the end of the chute, discharging into one bucket or the other through the opening J. This chute is preferably of the same width throughout its length, or it may be wider at the bottom than at the top. This form is adopted in order to enable coal or any other substance composed of small masses to be freely discharged and to prevent the clogging of the chute, as would be likely to be the case if the chute were narrower at the bottom than at the top. When the machine is used for weighing grain, this construction need not be adopted, and the chute may be narrower at the bottom than at the top, as is usual.

The walls of the bucket are attached to a horizontal frame O, to the center of which is connected a vertical rod P, which passes through the top of the case and through an opening in the top piece L. The weight of the contents of each of the buckets or receptacles is ascertained by means of a suitable balance or scale-beam connected with each of the rods.

Any suitable balance or weighing device may be used; but on the drawings I have shown a scale-beam R, which is supported upon the top piece L near each of the rods. This beam is pivoted upon a suitable support at $c$, and the outer arm $d$ of the scale carries an adjustable counterpoise $e$, capable of being fixed at any desired point on the arm $d$ by means of a set-screw $f$. The other end $g$ of the lever is fork-shaped and embraces the rod P, and on each side of the rod carries a roller $h$. Above this arm is pivoted to the rod a swinging piece S, which extends downward on both sides of the arm and carries on each side a roller $l$, which bears against the roller $h$, as shown. The sides of the piece are connected by a cross-piece $m$, on which is a set-screw $o$, by which the extent of the movement of the swinging piece S can be adjusted as may be required. These rollers are used for the purpose of obtaining curved bearing-surfaces which have as little friction as possible; but the curved surfaces may be obtained by rounding the ends of the arms $g$ and S. If the axes of the rollers were on the same vertical line, the support afforded by the arm $g$ would be unstable. The arm which bears the roller $l$, therefore, is curved toward the scale-beam. The set-screw $o$ regulates the extent of this movement and gages the stability of the suspension.

When the bucket is empty, the swinging piece S hangs vertically, or nearly so. By the action of the counterpoise $e$ on the arm $d$ the roller $h$ is maintained against the roller $l$, with the axes of both the rollers on nearly the same vertical line, and the swinging piece remains as shown on the left hand of Fig. 1 as long as the weight of the bucket is less than that of the counterpoise, as determined by its distance from the fulcrum of the scale-beam; but the moment that this weight is exceeded by that of the contents of the bucket the roller $l$ slides upon the roller $h$ and the swinging piece S is thrown outward, as shown on the right hand of Fig. 1, thus permitting the rod P to drop down and the bucket attached thereto to descend. A stop $p$ under the arm $d$ arrests the movement of this arm. As soon as the bucket has attained the desired weight and commences to descend it is obvious that the discharge of coal or other substance into this bucket must be interrupted and the position of the end of the chute N must be shifted, so that the discharge will be into the other bucket. This movement is effected automatically by the movement of the bucket. A convenient means for accomplishing this is by the engagement of a pin $r$ on the rod with the end of an arm T, attached to a rock-shaft $t$, pivoted in the side walls. A lever $u$ is attached to the shaft, and an arm V, pivoted to the end of the lever, is attached to the chute. As soon as the bucket descends the bottom of the same is automatically opened and the contents of the bucket are discharged, and the bucket is then returned to its normal position by the action of a counterpoise W, which is slightly heavier than the empty bucket. This counterpoise, as shown, may be attached at one end to a lever Y, pivoted on the top of the case, and its other end engaging with a pin $s$ on the rod P. When the bucket returns to its normal position, the swinging piece S also returns to its other position on the roller $l$. The opening in the bottom of the bucket should be large enough to enable its contents to be discharged more rapidly than the bucket is filled in order that the bucket may return to its normal position before the other bucket commences to descend. If the buckets do not move independently and one bucket is moved by the other, the counterpoise will not be necessary.

Any suitable device may be adopted for automatically opening the bottom of the bucket.

A suitable device is that shown in the drawings.

A' is a gate in the bottom of the bucket, hinged on one side to the frame I and balanced by a weighted arm B'. This gate, in the normal position of the bucket, is maintained closed by a latch C', pivoted to the frame I or to the bottom of the bucket. A lug D' is attached to the partition D and extends under the other end of the latch C', and as soon as the bucket commences to descend this end of the latch C' strikes the lug D', the latch is released from the gate, and the pressure on the gate of the material in the bucket overcomes the weight of the weighted arm, so that the gate opens. The gate, being heavier than the weighted arm, immediately opens, as shown on the right-hand side of Fig. 1.

In order to balance the weight of the counterpoise W, the scale-beam has attached to it, on the same side as the arm $g$, another arm F', carrying an adjustable counterpoise $a'$, having a set-screw, by means of which the counterpoise can be fixed in any desired position on the arm F'. The weight of the counterpoise W is capable of being varied according to the weight of the bucket, and consequently the counterpoise $a'$ is made adjustable on the arm F'. The arm F' may be dispensed with; but in that case the weight of the counterpoise W must be deducted from the reading on the arm $d$ of the scale-beam.

In order to facilitate the delivery of the coal or other substance into the buckets and insure its immediate delivery into the empty bucket as soon as the filled bucket commences to descend, a double-faced chute G' (shown in a separate view on Fig. 4) is pivoted to the top of the partition D and preferably extends through the opening J. This chute is opposite to the discharging-chute N, and is pivoted so that its upper end moves in a direction opposite to that of the movement of the end of the chute N. This movement is effected by the rod P simultaneously with the movement of the chute N, so that when the end of this chute N moves in one direction the end of the chute G' moves in the other. A convenient manner of effecting this result is by extending the lever $u$ and pivoting to its extremity an arm H', connected to the chute G'. Instead of being pivoted upon a partition, the double-faced chute may be pivoted upon a bar between the spaces in which the buckets move. This arrangement of the chute oscillating in opposite directions has the effect of decreasing the width of the arc which must be described by the end of the oscillating chute N in order to insure the delivery of the coal or other substance alternately into one or the other of the two receptacles, and thus conduces to the immediate shifting of the descending stream when the filled bucket commences its descent, thus reducing to a minimum the possibility of any overcharge of the bucket after it is filled.

I have described and shown a convenient device for moving the chute N and the chute G' by the movement of the rods P; but in carrying my invention into effect I do not limit myself to this mechanism. I also do not limit myself to the device which I have shown for releasing the buckets from the scale-beams or balances.

Above the buckets and between the wall of the case and the partition is a ring of sheet metal I', the lower edge of which projects over the rim of the bucket and prevents the passage of free particles of coal or of coal-dust into the spaces between the walls of the bucket and of the partition and the walls of the case.

A suitable registering device may be connected to and operated by any moving part of the machine to register the number of times that the buckets move in the operation of the machine. This registering device is common in weighing-machines of this class.

Having thus described my invention, what I claim, and desire to secure by Letters Patent of the United States, is—

1. In a weighing-machine, the combination, substantially as and for the purpose set forth, of two buckets or receptacles arranged side by side and having a vertical movement, a scale-beam or balance connected to each bucket or receptacle and operating to hold the bucket in position, but permitting its descent when it has received a load equal in weight to the weight indicated upon the balance or scale-beam, an oscillating chute discharging alternately into one bucket or the other, according to the position of the end of the chute, mechanism operated by the movement of a loaded bucket to oscillate the chute, whereby it will discharge into the empty bucket, a double-faced chute pivoted under the discharging-chute and oscillating in an opposite direction, and mechanism operated by the downward movement of each bucket to simultaneously oscillate these chutes in opposite directions.

2. In a weighing-machine, the combination, substantially as and for the purpose set forth, of two buckets or receptacles arranged side by side and each having an independent vertical movement, a scale-beam or balance connected to each bucket or receptacle and operating to hold the bucket in position, but permitting its descent when it has received a load equal in weight to the weight indicated upon the balance or scale-beam, an oscillating chute discharging alternately into one bucket or the other, according to the position of the end of the chute, a double-faced chute pivoted under the discharging-chute and oscillating in the opposite direction, mechanism operated by the downward movement of each bucket to simultaneously oscillate these chutes in opposite directions, a weight attached to each bucket for raising the bucket when relieved of the weight of its contents by the discharge of the same, a hinged gate in the bottom of each bucket opening downward, and mechanism operating to automatically open said gate when the bucket is filled and descends and to close the gate when the bucket is filled.

3. The combination, substantially as and for the purpose set forth, of the rod P, attached to the bucket E, the adjustable swinging piece S, pivoted on said rod and embracing the same, the scale-beam R and the arm $g$ on the same, embracing the rod P, and curved surfaces on the ends of the swinging piece S and arm $g$, bearing against each other.

4. The combination, substantially as and for the purpose set forth, of the rod P, attached to the bucket E, the adjustable swinging piece S, pivoted on said rod and embracing the same, the rollers $l$ on said swinging piece S, the scale-beam R, and the arm $g$ on the same, embracing the rod P and carrying rollers $h$, which bear against the rollers $l$.

5. The combination, substantially as and for the purpose set forth, of the oscillating discharging-chute, the rods P P, each attached, respectively, to a bucket or receptacle E, arms T T, each extending toward the center of the case and attached to a rock-shaft $t$, pivoted on the case on opposite sides of each rod, a pin $r$ on each rod above the free end of each lever and engaging with the same only on the descent of the rod, the lever $u$, one on each rock-shaft, and the arm V, pivoted on the arm $u$ and attached to the oscillating chute, whereby the engagement of the pin $r$ with each arm T effects the movement of the oscillating chute.

6. The combination, substantially as and for the purpose set forth, of the oscillating discharging-chute N, the rods P P, each attached, respectively, to a bucket or receptacle E, arms T T, each extending toward the center of the case and attached to a rock-shaft $t$, pivoted to the case on opposite sides of each rod, a pin $r$ on each rod above the free end of each arm T and engaging with the same on the descent of the rod, the levers $u$, one on each rock-shaft, the arm V, pivoted on the levers $u$ and attached to the oscillating chute N, whereby the engagement of the pin $r$ with each arm T effects the movement of the oscillating chute, the oscillating double-faced chute G', pivoted with the chute N, and arms H' H', each pivoted to a lever $u$ and connected to opposite sides of the chute G', as described.

7. The combination, substantially as and for the purpose set forth, with the top of the case A, of the opening J on the same, the oscillating double-faced chute G', moving in said opening, and the oscillating discharging-chute N, having its discharging end not less in width than the width of the remainder of the chute.

In testimony whereof I have signed my name to this specification, in the presence of two subscribing witnesses, on this 23d day of September, A. D. 1889.

CHAS. H. PHILLIPS.

Witnesses:
ALEX. L. HAYES,
FRANK G. PARKER.